US010255249B1

(12) United States Patent
Yu et al.

(10) Patent No.: US 10,255,249 B1
(45) Date of Patent: Apr. 9, 2019

(54) PREVIEWING ELECTRONIC BOOK CONTENT WITHIN THIRD-PARTY WEBSITES

(71) Applicant: Amazon Technologies, Inc., Seattle, WA (US)

(72) Inventors: Wainwright Gregory Siady Yu, Seattle, WA (US); Anisha Gulabani, Sammamish, WA (US); Andrew Olcott, Seattle, WA (US); Robert Wayne Roth, Renton, WA (US); Joon Hao Chuah, Seattle, WA (US); Jeffrey Craig Kunins, Seattle, WA (US); Brandon LaBranche Watson, Woodinville, WA (US); Simran K. Dua, Seattle, WA (US); Manigandan Natarajan, Bellevue, WA (US); Mohammad Kanso, Seattle, WA (US); William M. Hsu, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 135 days.

(21) Appl. No.: 14/581,555

(22) Filed: Dec. 23, 2014

(51) Int. Cl.
  *G06F 17/20* (2006.01)
  *G06F 17/21* (2006.01)
  *G06F 17/30* (2006.01)

(52) U.S. Cl.
  CPC ...... *G06F 17/212* (2013.01); *G06F 17/30893* (2013.01)

(58) Field of Classification Search
  CPC .................................................. G06F 17/30893
  See application file for complete search history.

(56) References Cited

U.S. PATENT DOCUMENTS

| 6,122,647 A * | 9/2000 | Horowitz ......... G06F 17/30873 707/999.003 |
| 7,783,644 B1 * | 8/2010 | Petrou ............... G06F 17/30864 707/748 |
| 8,874,731 B1 * | 10/2014 | Puppin .............. G06F 17/30867 707/736 |
| 2003/0105589 A1 * | 6/2003 | Liu .................... G06F 17/30017 702/1 |
| 2004/0078265 A1 * | 4/2004 | Subramanian .... G06F 17/30867 705/14.64 |
| 2008/0016101 A1 * | 1/2008 | Ginsburg .......... G06F 17/30864 |
| 2008/0034381 A1 | 2/2008 | Jalon et al. |

(Continued)

*Primary Examiner* — Stephen S Hong
*Assistant Examiner* — Shahid K Khan
(74) *Attorney, Agent, or Firm* — Eversheds Sutherland (US) LLP

(57) ABSTRACT

Electronic content such as an electronic book (e-book) that is referenced in or otherwise related to other content such as website content is identified, and a visual representation of the electronic content is generated. The visual representation is presented in conjunction with the website content, and a reader application for previewing the electronic content is launched via user interaction with the visual representation. Exiting the reader application causes a browser application that is rendering the website content to be automatically returned to a foreground state. A variety of actions are enabled via interaction with the reader application such as purchasing the electronic content, sharing the electronic content, or downloading a sample preview of the electronic content for later consumption.

20 Claims, 9 Drawing Sheets

(56) References Cited

U.S. PATENT DOCUMENTS

| | | | |
|---|---|---|---|
| 2008/0275980 A1* | 11/2008 | Hansen | G06Q 30/02 709/224 |
| 2009/0083779 A1* | 3/2009 | Shteyn | G06Q 30/02 725/14 |
| 2011/0213655 A1* | 9/2011 | Henkin | G06Q 30/00 705/14.49 |
| 2014/0154657 A1* | 6/2014 | Healy | G09B 5/00 434/362 |
| 2014/0337730 A1 | 11/2014 | King et al. | |
| 2015/0039475 A1 | 2/2015 | Sterling | |
| 2016/0140085 A1 | 5/2016 | Reid et al. | |

* cited by examiner

PREVIEWING ELECTRONIC BOOK CONTENT WITHIN THIRD-PARTY WEBSITES

BACKGROUND

Consumers use the Internet to search and browse for a variety of different types of content. While browsing the Internet, a user may encounter a website that specifically references or otherwise relates to other content such as book that may be available in an electronic format. If the user desires to learn more about this other electronic content, he/she must leave the current context of their Internet browsing activity and perform a search or browse for the other electronic content, which may be disruptive to the user experience.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1A:
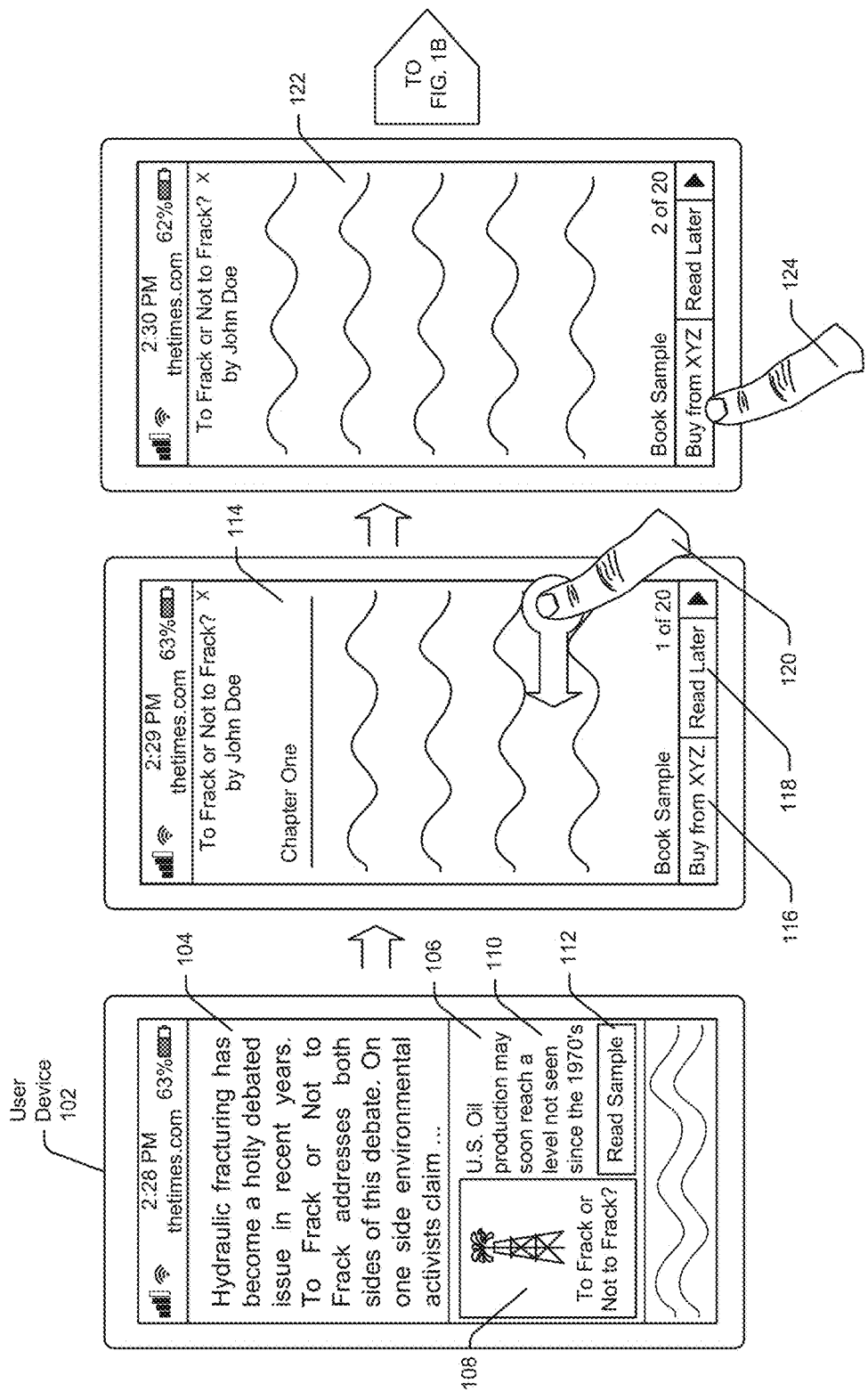
FIGS. 1A-1B are schematic diagrams of an illustrative use case in which electronic content that is related to source content rendered by a browser application is previewed and subsequently purchased using a reader application that is launched via user interaction with the browser application in accordance with one or more example embodiments of the disclosure.

This disclosure relates to, among other things, systems, methods, computer-readable media, techniques, and methodologies for identifying electronic content such as an electronic book (e-book) that is referenced in or otherwise related or relevant to other content such as website content, generating a visual representation of the electronic content, presenting the visual representation in conjunction with the website content, launching a reader application for previewing the electronic content in response to user interaction with the visual representation, and enabling any of a variety of actions to be performed via interaction with the reader application such as, for example, purchasing the electronic content, sharing the electronic content, downloading a sample preview of the electronic content for later consumption, or the like. The reader application may be launched in a manner that maintains a current state of a browser application that is rendering the website content. For example, a user interface (UI) of the reader application may be presented as an overlay over a window or tab of the browser application, and the reader application UI may provide the capability to exit the reader application and return to the browser application rendering the website content without having to perform a separate action to bring the window or tab of the browser application to a foreground state. In this manner, the variety of actions enabled by the reader application may be performed without disrupting the online experience of a user. While example embodiments of the disclosure may be described in the context of e-books, it should be appreciated that such example embodiments are applicable to any form of electronic content including, but not limited to, video content, audio content, other textual or graphical content, interactive content, or the like.

In an example embodiment, a user may utilize a browser application executing on a user device to access website content. The website content may include a specific reference to an e-book such as, for example, at least a portion of a book title; an identifier such as an International Standard Book Number (ISBN), Amazon Standard Identification Number (ASIN), or the like; or any other suitable identifier. Executable computer code embedded in or otherwise associated with executable source code of the website may be linked to the e-book identifier included in the website content. For example, the executable computer code may be, for example, a client-side script (e.g., Javascript) embedded in or otherwise associated with the website source content and may include one or more tags corresponding to e-book identifiers included in the website content. The executable computer code may further include code for generating a visual representation of the e-book. The visual representation may be, for example, a content card that can be presented in conjunction with the website content (e.g., rendered by a browser application as part of a rendering of the website content). Alternatively, the executable computer code may transmit an indication of the identifier to a remote server which may, in turn, generate the content card (or retrieve a previously generated content card corresponding to the identifier) and transmit the content card to a host device storing the website source code which may, in turn, transmit the content card to the browser application. The browser application may be configured to display the content card in connection with the website content. For example, the content card may be presented in-line with the website content. In still other example embodiments, the executable computer code may retrieve a previously generated content card responsive to determining that the website content includes an identifier of an e-book. While the visual representation may be described in example embodiments as a content card, it should be appreciated that it may take on any suitable form for conveying information about the corresponding e-book. Further, while a visual representation is described, it should be appreciated that the representation may include one or more portions that may be presented to a user via audio or haptic output.

The content card may include an image or other graphic that is representative of the e-book (e.g., a cover image). The content card may further include a string of text such as, for example, a synopsis of the e-book content, an excerpt of text from the e-book, or the like. The synopsis of the e-book content may have been previously generated and linked to the e-book. The excerpt of text of the e-book may include a direct quote from the e-book, a paraphrased version of a section of e-book content, or the like. The excerpt may be identified from user-generated content such as, for example, any of a variety of types of electronic messages including, but not limited to, an email message, a short message service (SMS) message, an instant message, a post on a social network platform, or the like. While the excerpt of the e-book included in the visual representation may be illustratively described herein as a string of text included in the e-book content, it should be appreciated that the excerpt may include audio, video, and/or graphical content elements of the e-book content.

In certain example scenarios, the e-book text included in the visual representation may be selected based on the results of randomized testing involving a control group and a treatment group (e.g., A/B testing). For example, different portions of the e-book text may be included in the visual representation of the e-book that is rendered on different user devices. The different portions of the e-book text may be the same size or substantially the same size (e.g., include the same or substantially the same number of text characters) or may vary in size. Performance metrics relating to user interactions with the visual representations may then be collected over some period of time. For example, for each portion of the e-book text included in a visual representation of the e-book, the performance metrics may include, without limitation, a number of launches of a reader application to preview the e-book content, a number of purchases of the e-book content initiated via the reader application, a number of shares of the e-book content initiated via the reader application, a number of downloads of sample previews of the e-book initiated via the reader application, and so forth. In certain example embodiments, the performance metrics may include a metric representative of a number of ratings or reviews received that indicate positive or negative user sentiment towards portions of e-book text. The user ratings or reviews may be provided in accordance with a binary rating scale (e.g., "likes" and "dislikes"); a rating scale having more than two incremental rating values (e.g., a "5 star" rating scale); free-form text that may be processed using, for example, natural language processing to determine whether the free-form text indicates positive or negative user sentiment; and so forth. The performance metrics may be used to assess the extent to which any given portion of the e-book text is more or less likely to cause desired user behavior than one or more other portions of the e-book text. For example, the performance metrics relating to different portions of the e-book text may be compared against one another and/or against one or more thresholds to determine whether a particular portion of the e-book should be selected for inclusion in a content card for the e-book. In this manner, those portions of the e-book text that are more likely to engender desired user behavior (as determined from the performance metrics), may be chosen for inclusion in visual representations of the e-book.

The portions of the e-book chosen for the A/B testing or the like may be initially chosen randomly and later refined over time as performance metrics are gathered. For example, the performance metrics may indicate that a certain portion of the e-book is more likely to cause desired user behavior, in which case, contextually related portions of the e-book may be identified and tested. In other example embodiments, portions of the e-book may be selected for testing (or in lieu of testing) based on aggregate user data such as, for example, social networking data that indicates popular quotes or excerpts from the e-book or user-specific data that indicates a particular user's preference for or positive sentiment towards a particular portion of the e-book text. Further, in certain example embodiments, consumption data corresponding to the e-book and potentially associated with an aggregate number of users may be used to identify a portion of the e-book text to test for performance or to include in the visual representation in lieu of testing. For example, a portion of the e-book text that has received the most user annotations, highlights, bookmarks, or the like may be selected. In addition, a first portion of the e-book text may be initially chosen for inclusion in a content card for the e-book based on a first type of performance metric (e.g., a number of times the reader application was launched during testing of the first portion of the e-book text) and may be later replaced with a second portion of the e-book text based on a second type of performance metric (e.g., a number of times purchases of the e-book initiated from the reader application launched during testing of the second portion of the e-book text).

In addition, in certain example embodiments, one or more words, phrases, or the like indicative of a subject matter of the website text may be determined. A matching word, phrase, or the like may be located in the e-book text and a predetermined portion of the e-book text that includes the matching word, phrase, or the like may selected for inclusion in the visual representation. In certain example embodiments, rather than selecting a predetermined portion of the e-book text that includes a matching word, phrase, or the like, natural language processing or the like may be performed on a portion of the e-book text that includes the matching word or the phrase to determine a semantically appropriate amount of e-book text to include in the visual representation. Further, in certain example embodiments, natural language processing or the like may be performed on the website text and the e-book text to determine a portion of the e-book text that has a semantic context that falls within a threshold tolerance of a semantic context of the website text. The determined portion of the e-book may then be selected for inclusion in the visual representation of the e-book.

The visual representation (e.g., content card) may further include a selectable widget (e.g., button, icon, etc.) that upon selection causes a reader application to be launched. The reader application may be launched within an existing browser application rendering the website content. For example, a UI of the reader application may be presented as an overlay over a browser window or tab. The UI of the reader application may include a selectable widget that enables exiting out of the reader application, which may cause the browser window or tab rendering the website content to automatically return to a foreground state.

Upon being launched, the reader application may initially display an initial portion of a sample preview of the e-book. For example, the sample preview may include a selected portion of the e-book (e.g., a first 20 pages or screen images of the e-book) and an initial portion (e.g., a first page or screen image) of the sample preview may be initially displayed. The user may be provided with a capability to transition through the various portions of the sample preview by applying a suitable gesture (e.g., a touch-based gesture such as a swipe) to a display of the user device. In other example embodiments, other forms of user input may be provided to transition through various portions of the sample preview such as, for example, user input generated as a result of actuation of a physical cursor button. In those example embodiments in which an excerpt of the e-book text is included in a content card for the e-book, the initial portion displayed in the reader application may include a portion of the e-book content that includes the excerpt. The sample preview may then include a predetermined portion of the e-book content appearing before and after the excerpt.

The UI of the reader application may include a variety of selectable widgets that may allow the user to perform various desired actions. For example, the UI of the reader application may include a first selectable widget that responsive to selection directs the reader application to a landing page for obtaining more information regarding the e-book and initiating a purchase of the e-book. The landing page may be rendered in the UI of the reader application. The UI of the reader application may further include a second selectable widget that responsive to selection directs the reader application to a sign-in page, which may be displayed in the UI of the reader application. Upon receipt of authentication credentials for the user via the sign-in page, a download of the sample preview of the e-book to a library associated with an account of the user with a service provider may be initiated. The user may then be provided with a capability to download a second reader application for consuming the preview at a later time. If the second reader application has already been downloaded to one or more user devices associated with the user's account, the user may request delivery of the sample preview to a selected user device. The UI of the reader application launched in connection with the browser application may further include a third selectable widget for sharing the visual representation of an e-book (e.g., content card) with one or more other users via, for example, a social networking platform. In addition, the UI of the reader application may include a fourth selectable widget that responsive to selection directs the reader application to a landing page via which the user may browse additional e-books directed to subject matter related to a subject matter of the e-book. The landing page may be displayed via the UI of the reader application.

In certain example embodiments of the disclosure, website content may not include a specific reference (e.g., an identifier) to an e-book. In such example embodiments, executable computer code may be provided in the form of, for example, a browser extension, plugin, or the like configured to analyze website content to locate one or more predetermined character strings in the website content. The character strings identified from the website content may be provided to a remote server that may be configured to identify candidate e-books to recommend based on a correspondence between the identified character strings and metadata associated with the candidate e-books. In this manner, the candidate e-books that are identified may relate to similar subject matter as the website content. For example, the character string "science fiction" located in website content may match a tag associated with an e-book, in which case, the e-book may be recommended in connection with the website content. Content cards for the candidate e-books may then be presented in, for example, a scrollable carousel within a presentation of the website content. In certain example embodiments, in addition to or in lieu of locating one or more predetermined character strings in the website content, a portion of the website content may be sent to the remote server. The remote server may perform natural language processing on the received portion of the website content to determine a semantic context of the content and may further identify candidate e-books to recommend based on the determined semantic context.

In certain example embodiments, a bot may be configured to execute automated scripts to fetch website content from any number of websites and provide the website content to one or more servers for processing of the content. The bot may be any suitable software application configured to execute automated tasks such as, for example, an Internet bot, a World Wide Web (WWW) robot, a web robot, or the like. The processing performed by the server(s) may include processing to locate one or more predetermined character strings in the website content which may be used to determine candidate e-books to recommend based on a correspondence between the character strings and metadata associated with the candidate e-books, similar to the process described above. Additionally, or alternatively, the processing may include natural language processing to determine a semantic context of the website content. In certain example embodiments, the bot may be configured to perform at least a portion of the processing described above as being performed by the server(s). A visual representation (e.g. a content card) for an e-book may then be presented in connection with website content. For example, a content card corresponding to a candidate e-book determined to be related to website content on a website may be associated with an identifier of an available space on the website, thereby causing the content card to be displayed on the website in the available space. As another example, a browser application executing on a user device may be configured to display the content card outside of the website when the corresponding website content is rendered by the browser application.

Example embodiments of the disclosure provide a number of technical features or technical effects. For example, in accordance with example embodiments of the disclosure, a reader application may be launched in connection with a browser application via interaction with a visual representation of electronic content that is rendered in conjunction with website content rendered by the browser application. An excerpt of content from the electronic content may be chosen for inclusion in the visual representation based on performance metrics that indicate that the excerpt is more likely than one or more other portions of the electronic content to cause desired user behavior. The reader application may provide the capability to perform a variety of actions including previewing a portion of the electronic content, purchasing the electronic content, sharing the portion of the electronic content, downloading a sample preview of the electronic content for later consumption, and so forth. A UI of the reader application may provide a capability to exit the reader application to cause a window or tab of the browser application in which the website content is rendered to be automatically returned to a foreground state without requiring separate user action. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 1B:
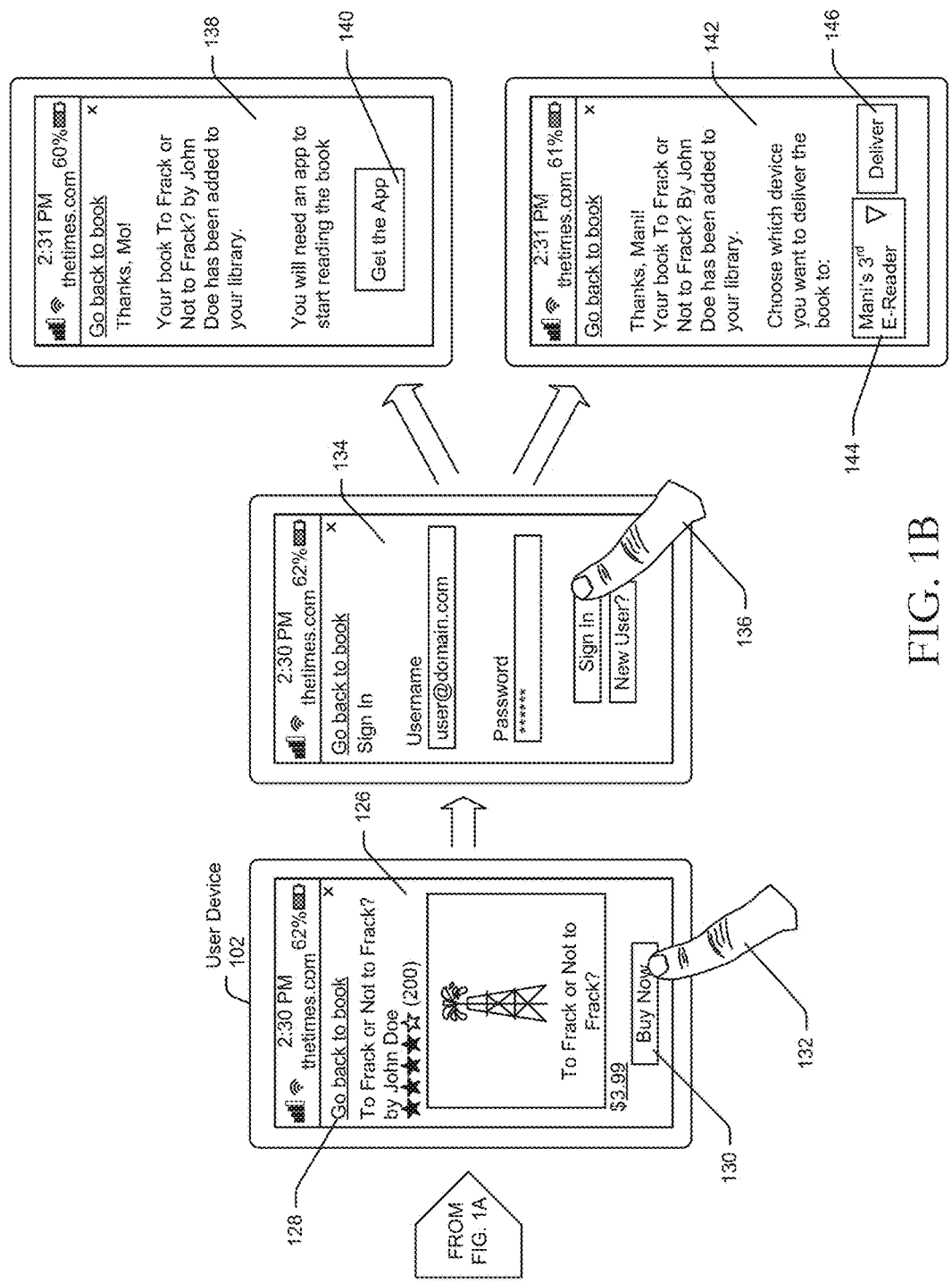

FIGS. 1A-1B are schematic diagrams of an illustrative use case involving the previewing of electronic content using a reader application launched in connection with a browser application in accordance with one or more example embodiments of the disclosure.

An illustrative user device 102 is depicted in FIG. 1A. The user device 102 may be a mobile device such as a smartphone, tablet, personal digital assistant, wearable computing device, or the like; a desktop computer; a laptop computer; and so forth. Website content 104 may be rendered on a display of the user device 102 within a window or tab of a browser application executing on the user device 102. A content card 106 may also be rendered by the browser application in conjunction with the website content 104. The content card 106 may be rendered, for example, inline with the website content 104. The content card 106 may be a visual representation of a particular e-book that may have been identified by computer-executable code configured to analyze the website content 104 and identify a specific reference (e.g., an identifier) to the e-book. The content card 106 may include an image 108 or other graphic of the e-book as well as a summary or excerpt 110 of the e-book content.

In certain example embodiments, the excerpt 110 may be identified from user-generated content such as, for example, any of a variety of types of electronic messages including, but not limited to, an email message, an SMS message, an instant message, a post on a social networking platform, or the like. Further, in certain example embodiments, the excerpt 110 included in the content card 106 may be selected based on the results of randomized testing involving a control group and a treatment group (e.g., A/B testing). For example, different portions of e-book text may be included in content cards corresponding to the e-book that are rendered on different user devices. Performance metrics relating to user interactions with the content cards (which may include any of the example performance metrics previously discussed) may be collected over some period of time. The performance metrics may be used to assess the extent to which any given portion of the e-book text is more or less likely to cause desired user behavior than one or more other portions of the e-book text. Desired user behavior may include launching of the reader application to preview the e-book, purchase of the e-book via interaction with the reader application, sharing of the sample preview of the e-book via interaction with the reader application, download, via interaction with the reader application, of the sample preview for later consumption, and so forth. In this manner, a portion of the e-book text that is more likely to engender desired user behavior (as determined from the performance metrics) may be chosen for inclusion as the excerpt 110 in the content card 106.

The portions of the e-book text chosen for the A/B testing or the like may be initially chosen randomly and later refined over time as performance metrics are gathered. In other example embodiments, portions of the e-book text may be selected for testing (or in lieu of testing) based on aggregate user data such as, for example, social networking data that indicates popular quotes or excerpts from the e-book or user-specific data that indicates a particular user's preference for or positive sentiment towards a particular portion of the e-book text. Further, in certain example embodiments, consumption data corresponding to the e-book and potentially associated with an aggregate number of users may be used to identify a portion of the e-book text to test for performance or to include in the content card 106 in lieu of testing. For example, a portion of the e-book text that has received the most user annotations, highlights, bookmarks, or the like may be selected for inclusion in the content card 106.

The content card 106 may further include a selectable widget 112 that responsive to selection causes a reader application for previewing the e-book content to be launched in connection with the browser application. Upon launching the reader application, a UI of the reader application may initially display an initial portion 114 of a sample preview of the e-book, where the sample preview includes predetermined portions of the e-book content. The sample preview may include contiguous or non-contiguous portions of the e-book content. A user may be provided with the capability to transition through the various portions of the sample preview by providing user input to the user device 102. For example, a user may apply one or more gestures to a portion of a display of the device 102 that is displaying the UI of the reader application to transition through various portions of the sample preview.

The UI of the reader application may further include various selectable widgets for initiating various actions to be performed. The selectable widgets may include a first widget 116 for directing the reader application to a landing page via which a purchase of the e-book can be initiated. The selectable widgets may further include a second widget 118 for initiating a process for downloading the sample preview for later consumption.

As shown in FIG. 1A, a user gesture 120 may cause the reader application to display a subsequent portion of the sample preview (e.g., a second screen image that includes e-book text that follows the initial screen image displayed by the UI of the reader application). A second user gesture 124 (e.g., a tap of the widget 116) may cause the reader application to be directed to a landing page 126 (e.g., a product detail page), as shown in FIG. 1B.

Referring now to FIG. 1B, the landing page 126 may be displayed within the UI of the reader application. The landing page 126 may include a selectable widget 128 for redirecting the reader application back to the sample preview of the e-book such that the sample preview is again displayed in the UI of the reader application and the user can resume consumption of the sample preview at a most recent portion of the sample preview. The landing page 126 may further include additional information about the e-book such as customer reviews and pricing information. The landing page 126 may additionally include a widget 130 for initiating a purchase of the e-book.

Responsive to a user selection 132 of the widget 130, the reader application may be directed to a sign-in page 134 that prompts the user for entry of authentication credentials associated with an account of the user that is maintained with a service provider that distributes the e-book. Upon receipt of a user selection 136 submitting the authentication credentials, the e-book may be downloaded to a library associated with the user's account. Thereafter, various alternative actions may be initiated depending on whether the user's account is associated with a user device on which a second reader application for consuming e-book content is downloaded.

If the user's account is not associated with a user device on which the second reader application is downloaded, the reader application may be directed to a landing page 138 that may indicate that the e-book has been downloaded to the library associated with the user's account. The landing page 138 may include a selectable widget 140 for initiating a download of the second reader application to the user device 102. If, however, the user's account is associated with a user device on which the second reader application is downloaded, the reader application may be directed to a landing page 142 that indicates that the e-book has been downloaded to the library associated with the user's account. The landing page 142 may further include a widget 144 that allows the user to select a user device to which the e-book should be downloaded and a widget 146 for initiating transmission of the preview to the selected device. In certain example embodiments, if the second reader application has already been downloaded to the user device 102, it may be automatically launched responsive to delivery of the e-book to the user device 102.

Figure 2:
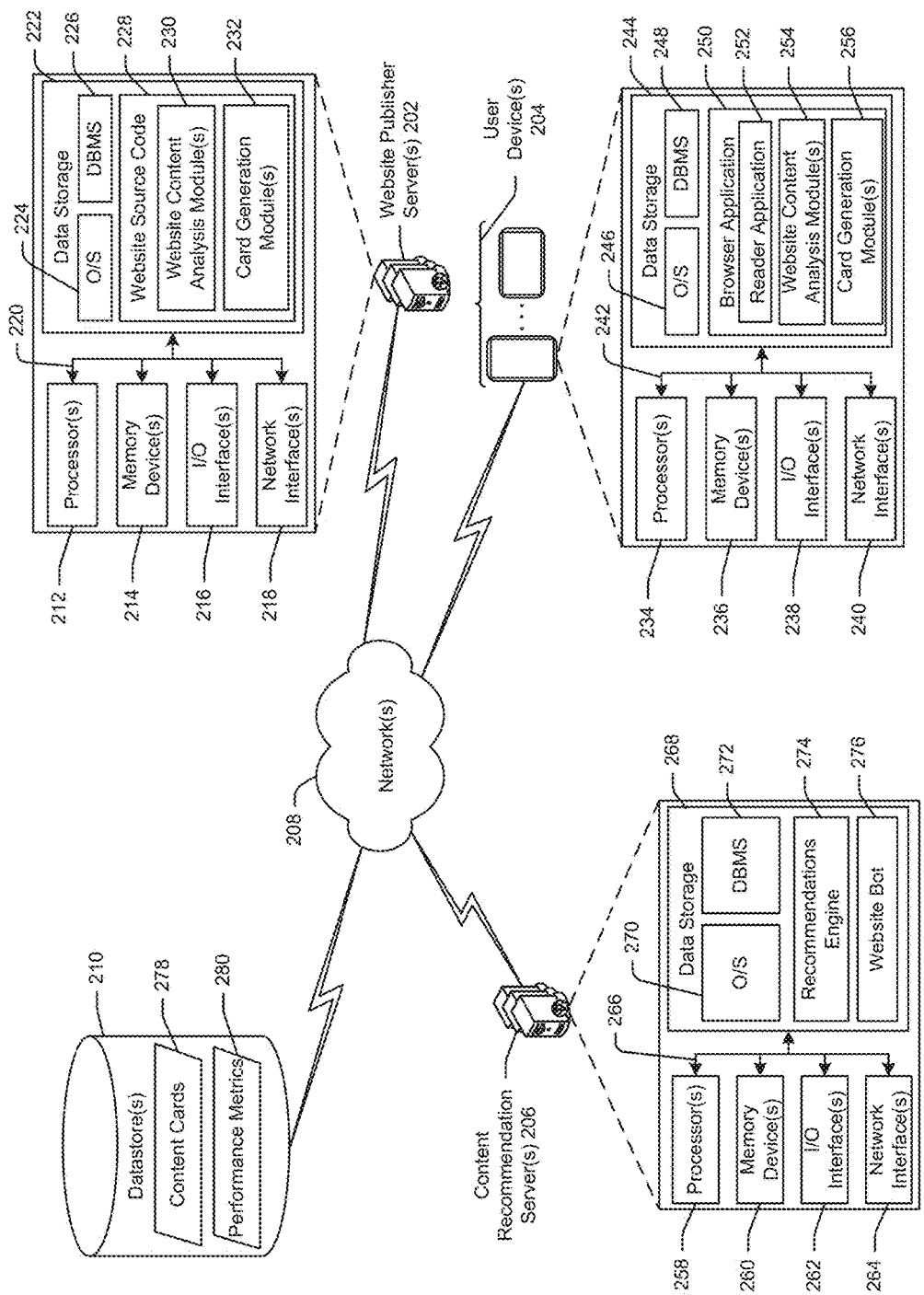
FIG. 2 is a schematic block diagram of an illustrative networked architecture in accordance with one or more example embodiments of the disclosure.

FIG. 2 is a schematic block diagram of an illustrative networked architecture in accordance with one or more example embodiments of the disclosure. The networked architecture 200 may include one or more website publisher servers 202, one or more user devices 204, and one or more content recommendation servers 206. The user device(s) 204 may include any of the types of user devices previously described. While the website publisher server(s) 202, the user device(s) 204, and the content recommendation server(s) 206 may be referred to herein in the singular, it should be appreciated that multiple ones of any of the illustrative components of the networked architecture 200 may be provided, and any processing described as being performed by a particular component of the architecture 200 may be performed in a distributed manner by multiple such components.

The website publisher server 202, the user device 204, and the content recommendation server 206 may be configured to communicate via one or more networks 208. The network(s) 208 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 208 may have any suitable communication range associated therewith and may include, for example, global networks (e.g., the Internet), metropolitan area networks (MANs), wide area networks (WANs), local area networks (LANs), or personal area networks (PANs). In addition, the network(s) 208 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the website publisher server 202 may include one or more processors 212, one or more memory devices 214 (generically referred to herein as memory 214), one or more input/output ("I/O") interface(s) 216, one or more network interfaces 218, and data storage 222. The website publisher server 202 may further include one or more buses 220 that functionally couple various components of the server 202. These various components of the server 202 will be described in more detail hereinafter.

The bus(es) 220 may include at least one of a system bus, a memory bus, an address bus, or a message bus, and may permit exchange of information (e.g., data (including computer-executable code), signaling, etc.) between various components of the server 202. The bus(es) 220 may include, without limitation, a memory bus or a memory controller, a peripheral bus, an accelerated graphics port, and so forth. The bus(es) 220 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 214 of the server 202 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 214 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 214 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, solid state storage, optical disk storage, and/or tape storage. The data storage 222 may provide non-volatile storage of computer-executable instructions and other data. The memory 214 and the data storage 222, removable and/or non-removable, are examples of computer-readable storage media (CRSM) as that term is used herein.

The data storage 222 may store computer-executable code, instructions, or the like that may be loadable into the memory 214 and executable by the processor(s) 212 to cause the processor(s) 212 to perform or initiate various operations. The data storage 222 may additionally store data that may be copied to memory 214 for use by the processor(s) 212 during execution of the computer-executable instructions. Moreover, output data generated as a result of execution of the computer-executable instructions by the processor(s) 212 may be stored initially in memory 214, and may ultimately be copied to data storage 222 for non-volatile storage.

More specifically, the data storage 222 may store one or more operating systems (O/S) 224; one or more database management systems (DBMS) 226; and one or more program modules, applications, or the like such as, for example, website source code 228, one or more website content analysis modules 230, and one or more card generation modules 232. Any of the program modules may include one or more sub-modules. In addition, the data storage 222 may store various other types of data that may be retrieved from one or more datastore(s) 210 such as, for example, data 278 representative of visual representations (e.g., content cards) of e-books or other forms of electronic content, data 280 indicative of one or more performance metrics, and so forth. Any of the modules depicted in FIG. 2 may include computer-executable code, instructions, or the like that may be loaded into the memory 214 for execution by one or more of the processor(s) 212. Further, any data stored in the data storage 222 may be loaded into the memory 214 for use by the processor(s) 212 in executing computer-executable code of the program modules. In addition, any data stored in datastore(s) 210 may be accessed via the DBMS 226 and loaded in the memory 214 for use by the processor(s) 212 in executing computer-executable code.

The processor(s) 212 may be configured to access the memory 214 and execute computer-executable instructions loaded therein. For example, the processor(s) 212 may be configured to execute computer-executable instructions of the various program modules of the server 202 to cause or facilitate various operations to be performed in accordance with one or more embodiments of the disclosure. The processor(s) 212 may include any suitable processing unit capable of accepting data as input, processing the input data in accordance with stored computer-executable instructions, and generating output data. The processor(s) 212 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 314 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 212 may be capable of supporting any of a variety of instruction sets.

Referring now to functionality supported by the various program modules depicted as part of the server 202 in FIG. 2, the website content analysis module(s) 230 may include computer-executable instructions, code, or the like that responsive to execution by one or more of the processor(s) 212 may cause operations to be performed for analyzing website content corresponding to the website source code 228 to identify a specific reference (e.g., an identifier) to electronic content included in the website content. The website content analysis module(s) 230 may further include computer-executable instructions for analyzing website content to locate one or more content elements such as one or more words, phrases, identifiers, or the like. The identified content elements may be sent to the content recommendations server 206, and a recommendations engine 274 of the server 206 may be executed to determine one or more candidate electronic content items (e.g., one or more e-books) to recommend based on the content elements. The candidate electronic content may be identified based on a correspondence between metadata associated with the candidate electronic content (e.g., one or more metadata tags) and the content elements identified from the website content. Further, in certain example embodiments, at least a portion of the website content corresponding to the website source code 228 may be sent to the content recommendation server 206, which may be configured to perform natural language processing on the received website content to determine a semantic context of the website content and to further identify candidate electronic content based thereon. It should be appreciated that in certain example embodiments, the website content analysis module(s) 230 may be configured to determine candidate electronic content using the content elements identified from the website content and/or using natural language processing. The website content analysis module(s) 230 may include one or more scripts written in any suitable scripting language such as Javascript.

The card generation module(s) 232 may include computer-executable instructions, code, or the like that responsive to execution by one or more of the processor(s) 212 may cause operations to be performed for generating a visual representation (e.g., a content card) of an electronic content item such as an e-book. The card generation module(s) 232 may further include computer-executable instructions, code, or the like that responsive to execution by one or more of the processor(s) 212 may cause operations to be performed for rendering a visual representation of an electronic content item as part of or otherwise in association with a rendering on a user device 204 of the website content corresponding to the website source code 228. In certain example embodiments, the visual representation may be received from another device (e.g., the server 206) and embedded in or otherwise associated with the website source code 228. Processing supported by each of the program module(s) depicted as part of the server 202 in FIG. 2 will be described in more detail later in this disclosure with reference to the illustrative method depicted in FIG. 4.

Referring now to other illustrative components depicted as being stored in the data storage 222, the 0/S 224 may be loaded from the data storage 222 into the memory 214 and may provide an interface between other application software executing on the server 202 and hardware resources of the server 202. More specifically, the 0/S 224 may include a set of computer-executable instructions for managing hardware resources of the server 202 and for providing common services to other application programs (e.g., managing memory allocation among various application programs). The 0/S 224 may include any operating system now known or which may be developed in the future including, but not limited to, any server operating system, any mainframe operating system, or any other proprietary or non-proprietary operating system.

The DBMS 226 may be loaded into the memory 214 and may support functionality for accessing, retrieving, storing, and/or manipulating data stored in the memory 214, data stored in the data storage 222, and/or data stored in the datastore(s) 210. The DBMS 226 may use any of a variety of database models (e.g., relational model, object model, etc.) and may support any of a variety of query languages. The DBMS 226 may access data represented in one or more data schemas and stored in any suitable data repository.

Referring now to other illustrative components of the server 202, one or more input/output (I/O) interfaces 216 may be provided that may facilitate the receipt of input information by the server 202 from one or more I/O devices as well as the output of information from the server 202 to the one or more I/O devices. The I/O devices may include, for example, one or more user interface devices that facilitate interaction between a user and the server 202 including, but not limited to, a display, a keypad or keyboard, a pointing device, a control panel, a touch screen display, a gesture capture device, a stylus, a remote control device, a microphone, a speaker, and so forth. The I/O devices may further include, for example, any number of peripheral devices such as data storage devices, printing devices, and so forth.

The server 202 may further include one or more network interfaces 218 via which the server 202 may communicate with any of a variety of other systems, platforms, networks, devices, and so forth. Such communication may occur via any of one or more of the network(s) 208.

Referring now to other illustrative components of the networked architecture 200, the user device 204 may include, in an illustrative configuration, one or more processors 234, one or more memory devices 236 (generically referred to herein as memory 236), one or more input/output ("I/O") interface(s) 238, one or more network interfaces 240, and data storage 244. The user device 204 may further include one or more buses 242 that functionally couple various components of the user device 204. These various components of the user device 204 will be described in more detail hereinafter.

The bus(es) 242 may include any of the buses and bus architectures described in reference to the bus(es) 220. The memory 236 of the user device 204 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. The memory 236 may include any of the types of memory described in reference to the memory 214.

The data storage 244 may include removable storage and/or non-removable storage including, but not limited to, magnetic storage, solid state storage, optical disk storage, and/or tape storage. The data storage 244 may provide non-volatile storage of computer-executable instructions and other data. The memory 236 and the data storage 244, removable and/or non-removable, are examples of computer-readable storage media (CRSM) as that term is used herein.

The data storage 244 may store computer-executable code, instructions, or the like that may be loadable into the memory 236 and executable by the processor(s) 234 to cause the processor(s) 234 to perform or initiate various operations. The data storage 244 may additionally store data that may be copied to memory 236 for use by the processor(s) 234 during execution of the computer-executable instructions. Moreover, output data generated as a result of execution of the computer-executable instructions by the processor(s) 234 may be stored initially in memory 236, and may ultimately be copied to data storage 244 for non-volatile storage.

More specifically, the data storage 244 may store one or more operating systems (O/S) 246; one or more database management systems (DBMS) 248; and one or more program modules, applications, or the like such as, for example, a browser application 250, a reader application 252, one or more website content analysis modules 254, and one or more card generation modules 256. Any of the program modules may include one or more sub-modules. For example, the reader application 252 may include one or more program modules that may be executable within a computing context of the browser application 250 such that a UI of the reader application 252 may be rendered within a content area of a window or tab of the browser application 250 that is rendering website content.

For example, as part of rendering the website source code, a rendering engine (e.g., layout engine, web browser engine, etc.) of the browser application 250 may also receive marked up content (e.g., hypertext markup language (HTML) content, Extensible Markup Language (XML) content, image files, selectable user interface objects, etc.) corresponding to the reader application 252 and/or formatting information that describes the look and formatting of the UI of the reader application 252 (e.g., stylesheet files such as Cascading Style Sheets (CSS) files, Extensible Stylesheet Language (XSL) files, etc.) as input and render—within a content area of a window in which the website content is rendered—the formatted content of the UI of the reader application 252 and associated user interface objects that enable functionality of the reader application 252. The rendered UI of the reader application 252 may include a user interface object that enables exiting the reader application to cause a window or tab of the browser application 250 in which website content is rendered to be automatically brought to a foreground state without requiring separate user action.

In addition to the program modules depicted in FIG. 2, the data storage 244 may store various other types of data that may be retrieved from the datastore(s) 210 such as, for example, the data 278 representative of visual representations (e.g., content cards) of e-books or other forms of electronic content, the data 280 indicative of one or more performance metrics, and so forth. Any of the modules depicted in FIG. 2 as part of the user device 204 may include computer-executable code, instructions, or the like that may be loaded into the memory 236 for execution by one or more of the processor(s) 234. Further, any data stored in the data storage 244 may be loaded into the memory 236 for use by the processor(s) 234 in executing computer-executable code. In addition, any data stored in datastore(s) 210 may be accessed via the DBMS 248 and loaded in the memory 236 for use by the processor(s) 234 in executing computer-executable code.

The processor(s) 234 may be configured to access the memory 236 and execute computer-executable instructions loaded therein. For example, the processor(s) 234 may be configured to execute computer-executable instructions of the various program modules of the user device 204 to cause or facilitate various operations to be performed in accordance with one or more embodiments of the disclosure. The processor(s) 234 may include any suitable processing unit capable of accepting data as input, processing the input data in accordance with stored computer-executable instructions, and generating output data. The processor(s) 234 may include any of the types of processors and any of the types of microarchitecture designs described in reference to the processor(s) 212.

Referring now to functionality supported by the various other program modules depicted as part of the user device 204 in FIG. 2, the website content analysis module(s) 254 may include computer-executable instructions, code, or the like that responsive to execution by one or more of the processor(s) 212 may cause operations to be performed for analyzing website content to determine one or more content elements such as one or more words, phrases, identifiers, or the like included in the website content. As previously described, the identified content elements may be sent to the content recommendations server 206, and the recommendations engine 274 of the server 206 may be executed to determine one or more candidate electronic content items (e.g., one or more e-books) to recommend based on the content elements. Further, in certain example embodiments, at least a portion of the website content may be sent to the content recommendation server 206, which may be configured to perform natural language processing on the received website content to determine a semantic context of the website content and to further identify candidate electronic content based thereon. It should be appreciated that in certain example embodiments, the website content analysis module(s) 254 may be configured to determine candidate electronic content using the content elements identified from the website content and/or using natural language processing. The website content analysis module(s) 254 may include a browser plugin, a browser extension, or the like.

The card generation module(s) 256 may include computer-executable instructions, code, or the like that responsive to execution by one or more of the processor(s) 234 may cause operations similar to those described in reference to the card generation module(s) 234 to be performed. Processing supported by each of the program module(s) depicted as part of the user device 204 in FIG. 2 will be described in more detail later in this disclosure with reference to the illustrative method depicted in FIG. 4.

Referring now to other illustrative components depicted as being stored in the data storage 244, the O/S 246 may be loaded from the data storage 244 into the memory 236 and may provide an interface between other application software executing on the user device 204 and hardware resources of the user device 204. More specifically, the O/S 246 may include a set of computer-executable instructions for managing hardware resources of the user device 204 and for providing common services to other application programs (e.g., managing memory allocation among various application programs). The O/S 246 may include any operating system now known or which may be developed in the future including, but not limited to, any server operating system, any mainframe operating system, or any other proprietary or non-proprietary operating system.

The DBMS 248 may be loaded into the memory 236 and may support functionality for accessing, retrieving, storing, and/or manipulating data stored in the memory 236, data stored in the data storage 244, and/or data stored in the datastore(s) 210. The DBMS 248 may use any of a variety of database models (e.g., relational model, object model, etc.) and may support any of a variety of query languages. The DBMS 248 may access data represented in one or more data schemas and stored in any suitable data repository.

Referring now to other illustrative components of the user device 206, one or more input/output (I/O) interfaces 238 may be provided that may facilitate the receipt of input information by the user device 204 from one or more I/O devices as well as the output of information from the user device 204 to the one or more I/O devices. The I/O devices may include any of the types of I/O devices described in reference to the I/O interface(s) 218.

The user device 204 may further include one or more network interfaces 240 via which the user device 204 may communicate with any of a variety of other systems, platforms, networks, devices, and so forth. Such communication may occur via any of one or more of the network(s) 208.

Referring now to other illustrative components of the networked architecture 200, the content recommendation server 206 may include, in an illustrative configuration, one or more processors 258, one or more memory devices 260 (generically referred to herein as memory 260), one or more input/output ("I/O") interface(s) 262, one or more network interfaces 264, and data storage 268. The server 206 may further include one or more buses 266 that functionally couple various components of the server 206. These various components of the server 206 will be described in more detail hereinafter.

The bus(es) 266 may include any of the buses and bus architectures described in reference to the bus(es) 220. The memory 260 of the server 206 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. The memory 260 may include any of the types of memory described in reference to the memory 214.

The data storage 268 may include removable storage and/or non-removable storage including, but not limited to, magnetic storage, solid state storage, optical disk storage, and/or tape storage. The data storage 268 may provide non-volatile storage of computer-executable instructions and other data. The memory 260 and the data storage 268, removable and/or non-removable, are examples of computer-readable storage media (CRSM) as that term is used herein.

The data storage 268 may store computer-executable code, instructions, or the like that may be loadable into the memory 260 and executable by the processor(s) 258 to cause the processor(s) 258 to perform or initiate various operations. The data storage 268 may additionally store data that may be copied to memory 260 for use by the processor(s) 258 during execution of the computer-executable instructions. Moreover, output data generated as a result of execution of the computer-executable instructions by the processor(s) 258 may be stored initially in memory 260, and may ultimately be copied to data storage 268 for non-volatile storage.

More specifically, the data storage 268 may store one or more operating systems (O/S) 270; one or more database management systems (DBMS) 272; and one or more program modules, applications, or the like such as, for example, a recommendations engine 274 and a website bot 276. The recommendations engine 274 may include computer-executable instructions, code, or the like that responsive to execution by one or more of the processor(s) 258 may cause operations to be performed to determine one or more candidate electronic content items (e.g., one or more e-books) to recommend based on content elements identified from website content by the website content analysis module(s) 230 and/or the website analysis module(s) 254.

The recommendations engine 274 may determine the candidate electronic content based on a correspondence between metadata associated with the candidate electronic content (e.g., one or more metadata tags) and the content elements identified from the website content. Further, in certain example embodiments, the recommendations engine 274 may include computer-executable instructions, code, or the like that responsive to execution by one or more of the processor(s) 258 may cause natural language processing of at least a portion of website content to be performed to determine a semantic context of the website content and to further identify candidate electronic content based thereon.

The website bot 276 may include computer-executable instructions, code, or the like (e.g., automated scripts) that responsive to execution by one or more of the processor(s) 258 may cause website content to be fetched from any number of websites and provided to the recommendations engine 274 for processing. The website bot 276 may include any suitable software application configured to execute automated tasks such as, for example, an Internet bot, a World Wide Web (WWW) robot, a web robot, or the like. As previously noted, the processing performed by the recommendations engine 274 may include processing to determine candidate e-books to recommend based on a correspondence between content elements identified from website content and metadata associated with the candidate e-books and/or natural language processing to determine a semantic context of the website content. In certain example embodiments, the website bot 276 may be configured to perform at least a portion of the processing described as being performed by the recommendations engine 274.

In addition to the program modules depicted in FIG. 2, the data storage 268 may store various other types of data that may be retrieved from the datastore(s) 210 such as, for example, the data 278 representative of visual representations (e.g., content cards) of e-books or other forms of electronic content, the data 280 indicative of one or more performance metrics, and so forth. Any of the modules depicted in FIG. 2 as part of the server 206 may include computer-executable code, instructions, or the like that may be loaded into the memory 260 for execution by one or more of the processor(s) 258. Further, any data stored in the data storage 268 may be loaded into the memory 260 for use by the processor(s) 258 in executing computer-executable code. In addition, any data stored in datastore(s) 210 may be accessed via the DBMS 272 and loaded in the memory 260 for use by the processor(s) 258 in executing computer-executable code.

The processor(s) 258 may be configured to access the memory 260 and execute computer-executable instructions loaded therein. For example, the processor(s) 258 may be configured to execute computer-executable instructions of the various program modules of the server 206 to cause or facilitate various operations to be performed in accordance with one or more embodiments of the disclosure. The processor(s) 258 may include any suitable processing unit capable of accepting data as input, processing the input data in accordance with stored computer-executable instructions, and generating output data. The processor(s) 258 may include any of the types of processors and any of the types of microarchitecture designs described in reference to the processor(s) 212.

Referring now to other illustrative components depicted as being stored in the data storage 268, the 0/S 270 may be loaded from the data storage 268 into the memory 260 and may provide an interface between other application software executing on the server 206 and hardware resources of the server 206. More specifically, the 0/S 270 may include a set of computer-executable instructions for managing hardware resources of the server 206 and for providing common services to other application programs (e.g., managing memory allocation among various application programs). The O/S 270 may include any operating system now known or which may be developed in the future including, but not limited to, any server operating system, any mainframe operating system, or any other proprietary or non-proprietary operating system.

The DBMS 272 may be loaded into the memory 260 and may support functionality for accessing, retrieving, storing, and/or manipulating data stored in the memory 260, data stored in the data storage 268, and/or data stored in the datastore(s) 210. The DBMS 272 may use any of a variety of database models (e.g., relational model, object model, etc.) and may support any of a variety of query languages. The DBMS 272 may access data represented in one or more data schemas and stored in any suitable data repository.

Referring now to other illustrative components of the server 206, one or more input/output (I/O) interfaces 262 may be provided that may facilitate the receipt of input information by the server 206 from one or more I/O devices as well as the output of information from the server 206 to the one or more I/O devices. The I/O devices may include any of the types of I/O devices described in reference to the I/O interface(s) 218.

The server 206 may further include one or more network interfaces 264 via which the server 206 may communicate with any of a variety of other systems, platforms, networks, devices, and so forth. Such communication may occur via any of one or more of the network(s) 208.

It should be appreciated that the program modules, applications, computer-executable instructions, code, or the like depicted in FIG. 2 as being stored in the data storage 222, the data storage 244, and/or the data storage 268 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 202, the user device 204, the server 206, and/or hosted on other computing device(s) accessible via one or more of the network(s) 208, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the server 202, the user device 204, and/or the server 206 may include alternate and/or additional hardware, software, or firmware components beyond those described or depicted without departing from the scope of the disclosure. More particularly, it should be appreciated that software, firmware, or hardware components depicted as forming part of the server 202, the user device 204, and/or the server 206 are merely illustrative and that some components may not be present or additional components may be provided in various embodiments. While various illustrative program modules have been depicted and described as software modules stored in data storage 222, the data storage 244, and/or the data storage 268, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Figure 3:
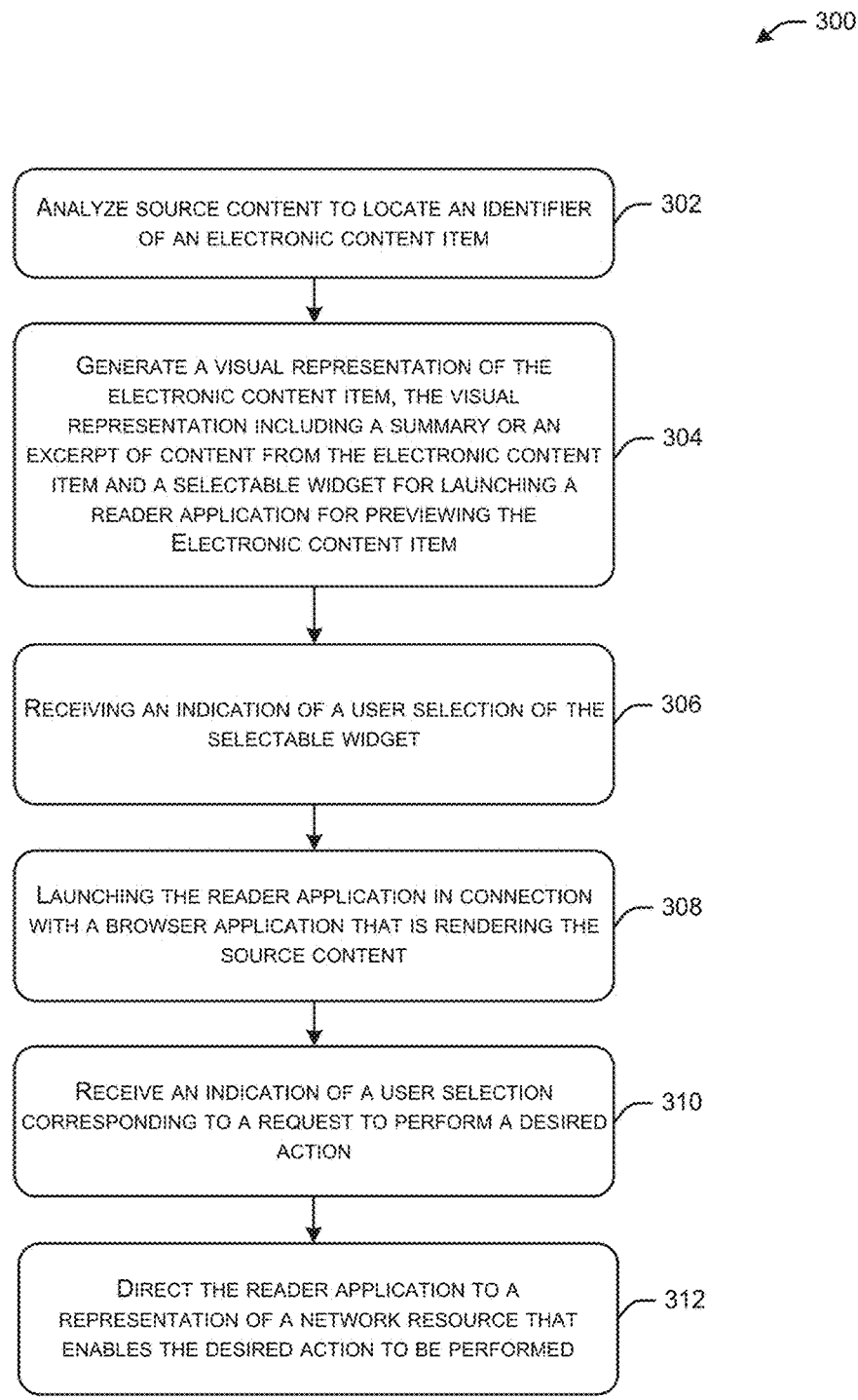
FIG. 3 is a process flow diagram of an illustrative method for launching a reader application that enables previewing electronic content corresponding to source content rendered by a browser application and initiating one or more actions corresponding to the electronic content in accordance with one or more example embodiments of the disclosure.

FIG. 3 is a process flow diagram of an illustrative method 300 in accordance with one or more example embodiments of the disclosure. One or more operations of the method 300 may be described above as being performed by a website publisher server 202, or more specifically, by one or more program modules, applications, or the like executing on the website publisher server 202. It should be appreciated, however, that any of the operations of method 300 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 300 may be described in the context of the illustrative website publisher server 202, it should be appreciated that such operations may be implemented in connection with numerous other device configurations.

At block 302, computer-executable instructions of the website content analysis module(s) 230 may be executed to analyze source content to locate an identifier of an electronic content item such as an e-book. The identifier may be at least a portion of a title of the electronic content item or any other suitable identifier such as an ISBN, ASIN, or the like.

At block 304, computer-executable instructions of the card generation module(s) 232 may be executed to generate a visual representation of the electronic content item such as, for example, a content card representative of an e-book. The content card may include a summary or synopsis of the e-book content or an excerpt from the e-book. If the content card includes an excerpt from the e-book, computer-executable instructions of the card generation module(s) 232 may be executed to determine a portion of the e-book content (e.g., a portion of the e-book text) to select as the excerpt based, for example, on control group testing to determine which portions of the e-book text are associated with desired performance metrics. Additionally, or alternatively, user-generated content (e.g., e-mails, SMS messages, social networking posts, etc.) may be analyzed to determine the excerpt, aggregate user data may be analyzed to identify popular quotes, citations, etc. from the e-book to select as the excerpt, and/or user consumption data may be analyzed to select as the excerpt a portion of the e-book receiving a threshold number of comments, annotations, highlights, bookmarks, or the like. The content card may further include a selectable widget that responsive to selection causes a reader application for previewing the e-book content to be launched.

At block 306, an indication of a user selection of the selectable widget may be received, and at block 308, the reader application may be launched in connection with a browser application that is rendering the source content. For example, a UI of the reader application may be displayed as an overlay over a window or tab of the browser application in which the source content is rendered. A user may be provided with a capability to exit the reader application to cause window or tab of the browser application in which the source content is rendered to be automatically returned to a foreground state.

At block 310, an indication of a user selection corresponding to a request to perform a desired action may be received. As previously described, the UI of the reader application may include any number of selectable widgets that responsive to selection may cause various actions to be initiated such as, for example, directing the reader application to a landing page for initiating a purchase of the e-book, directing the reader application to a landing page for initiating a sharing of the sample preview of the e-book on one or more social network platforms, directing the reader application to a landing page for initiating a download of the sample preview of the e-book, and so forth. At block 312, the reader application may be directed to an appropriate network resource (e.g., a landing page) for performing the action initiated at block 310 via selection of the corresponding widget.

Figure 4:
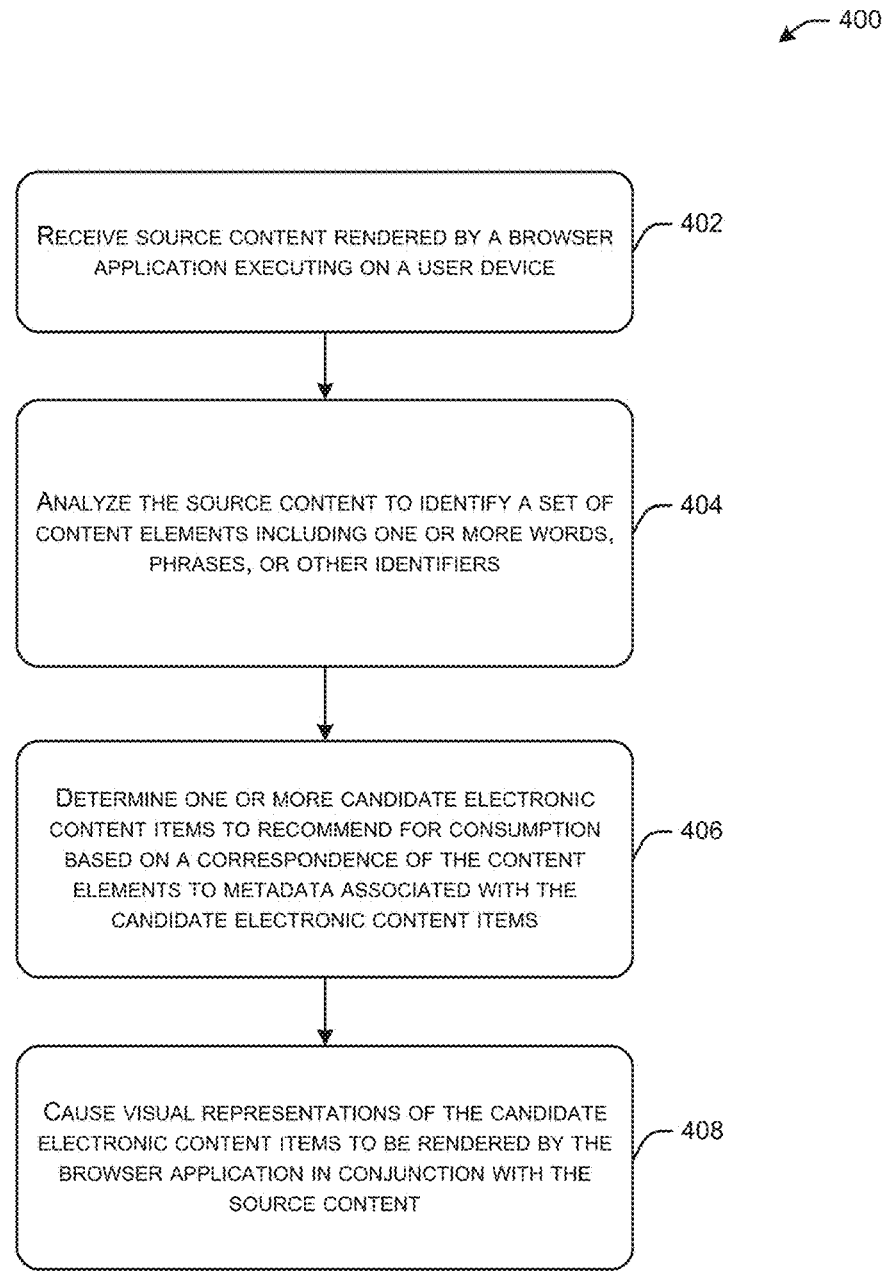
FIG. 4 is a process flow diagram of an illustrative method for determining candidate electronic content related to source content rendered by a browser application and presenting representations of the candidate electronic content in connection with the source content in accordance with one or more example embodiments of the disclosure.

FIG. 4 is a process flow diagram of another illustrative method 400 in accordance with one or more example embodiments of the disclosure. One or more operations of the method 400 may be described above as being performed by a content recommendation server 206, or more specifically, by one or more program modules, applications, or the like executing on the content recommendation server 206. It should be appreciated, however, that any of the operations of method 400 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 400 may be described in the context of the illustrative content recommendation server 206, it should be appreciated that such operations may be implemented in connection with numerous other device configurations.

At block 402, the content recommendation server 206 may receive source content (e.g., website content) identified by a browser extension, plugin, or the like (e.g., the website content analysis module(s) 254) associated with a browser application executing on a user device. Additionally, or alternatively, the content recommendation server 206 may receive the source content from the website content analysis module(s) 230 or the website bot 276.

At block 404, computer-executable instructions of the recommendations engine 274 may be executed to analyze the source content to identify a set of content elements included in the source content. The content element(s) may include one or more words, phrases, or other identifiers indicative of a subject matter of the source content. In certain example embodiments, the website content analysis module(s) 254, the website content analysis module(s) 230, or the website bot 276 may be configured to analyze the source content to identify the content elements.

At block 406, computer-executable instructions of the recommendations engine 274 may be executed to determine one or more candidate electronic content items to recommend or suggest based on the analysis of the content element(s). For example, a determination may be made that one or more of the content element(s) match metadata tags associated with the candidate electronic content items.

At block 408, visual representations (e.g., content cards) representative of the electronic content items may be generated or retrieved from data storage and transmitted to the browser application. The browser application may then present the content cards in conjunction with the source content such as, for example, in a scrollable carousel within a rendering of the source content.

The operations described and depicted in the illustrative methods of FIG. 3 or 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 or 4 may be performed.

Figure 5:
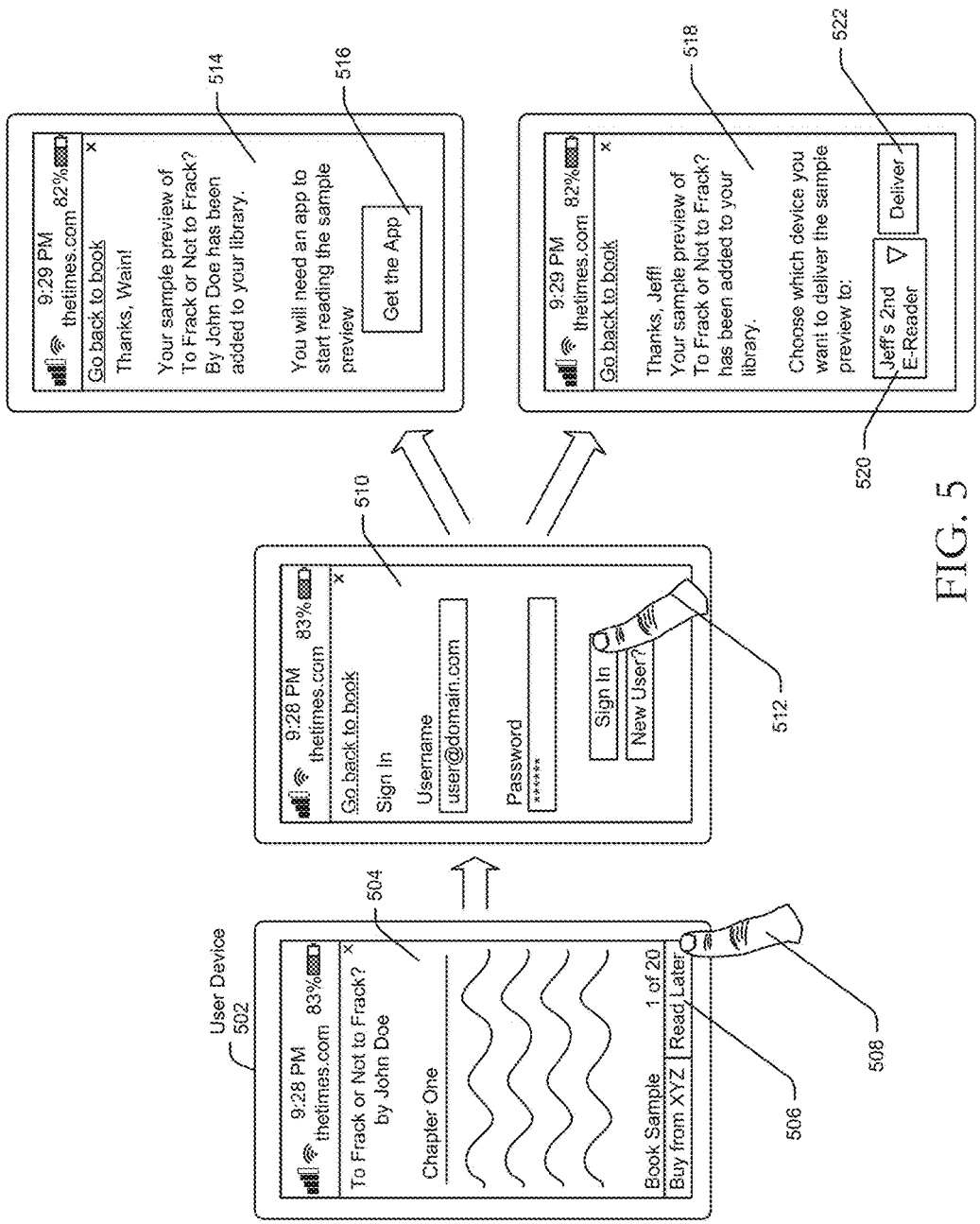
FIG. 5 is a schematic diagram of an illustrative use case in which a sample preview of electronic content related to source content rendered by a browser application is downloaded using a reader application that is launched via user interaction with the browser application in accordance with one or more example embodiments of the disclosure.

FIG. 5 is a schematic diagram of an illustrative use case in which a sample preview of electronic content related to source content rendered by a browser application is downloaded using a reader application that is launched via user interaction with the browser application in accordance with one or more example embodiments of the disclosure.

A user device 502 is illustratively depicted. A portion 504 of a sample preview of an e-book is shown as being displayed by a reader application launched on the user device 502. The reader application may have been launched responsive to selection of a widget included in a content card corresponding to the e-book and may have been launched in connection with a browser application that is rendering website content related to the e-book.

The UI of the reader application may include a selectable widget 506 for initiating a download of the sample preview of the e-book to a library associated with user account maintained at a service provider that distributes the e-book. Responsive to a user selection 508 of the widget 506, the reader application may be directed to a sign-in page via which the user may enter authentication credentials associated with the user's account. Upon receipt of a user selection 512 submitting the authentication credentials, the user may be authenticated and a download of the sample preview of the e-book to the user's library may be initiated.

If the user's account is not associated with a user device on which a second reader application for consuming the sample preview of the e-book is downloaded, the reader application may be directed to a landing page 514 that may include a widget 516 for initiating a download of a second reader application for consuming the sample preview at a later time. If the second reader application has already been downloaded to one or more user devices associated with the user's account, the reader application may be directed to a landing page 518 that may include a widget 520 for selecting a user device to which the sample preview should be sent and a widget 522 for initiating delivery of the sample preview to the selected user device.

Figure 6:
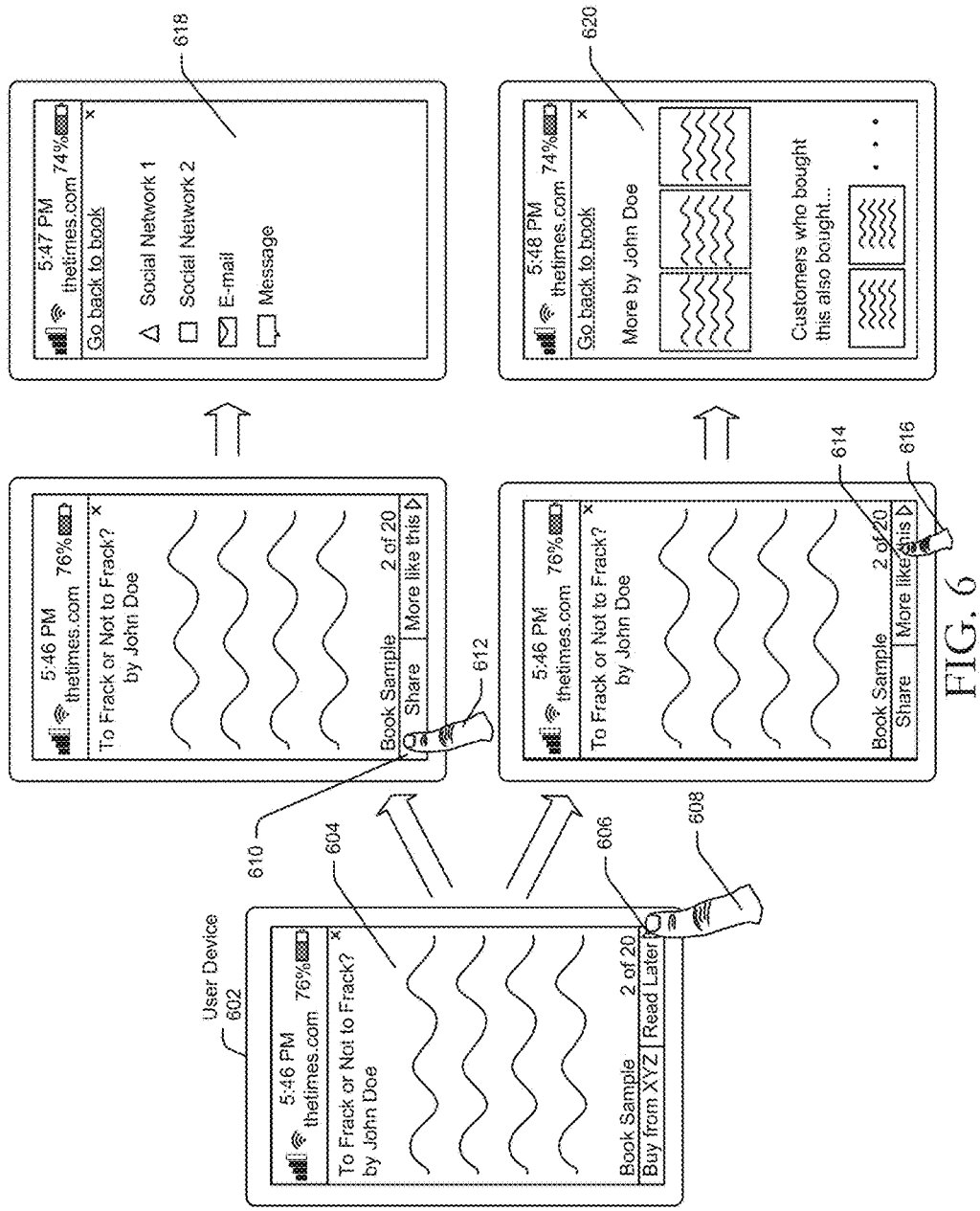
FIG. 6 is a schematic diagram of an illustrative use case in which electronic content related to source content rendered by a browser application is shared or related electronic content is browsed using a reader application that is launched via user interaction with the browser application in accordance with one or more example embodiments of the disclosure.

FIG. 6 is a schematic diagram of an illustrative use case in which electronic content related to source content rendered by a browser application is shared or related electronic content is browsed using a reader application that is launched via user interaction with the browser application in accordance with one or more example embodiments of the disclosure.

A user device 602 is illustratively depicted. A portion 604 of a sample preview of an e-book is shown as being displayed by a reader application launched on the user device 602. The reader application may have been launched responsive to selection of a widget included in a content card corresponding to the e-book and may have been launched in connection with a browser application that is rendering website content related to the e-book.

The UI of the reader application may include a widget 606 that responsive to a user selection 608 may cause additional widgets to be displayed. Selection 612 of a widget 610 may cause the reader application to be directed to a landing page via which the user can select one or more social networking platforms on which the sample preview of the e-book can be shared. More specifically, a content card corresponding to the e-book may be shared. The content card may have been presented in conjunction with related website content, and as described previously, may include a widget that responsive to selection causes the reader application to be launched. The content card may also be shared via email, SMS message, instant message, or the like.

Selection 616 of a widget 614 may cause the reader application to be directed to an alternative landing page 620 via which the user can browse additional e-books authored by the same author as the e-book being previewed using the reader application and related e-books such as e-books also purchased by customers who purchased the previewed e-book.

Figure 7:
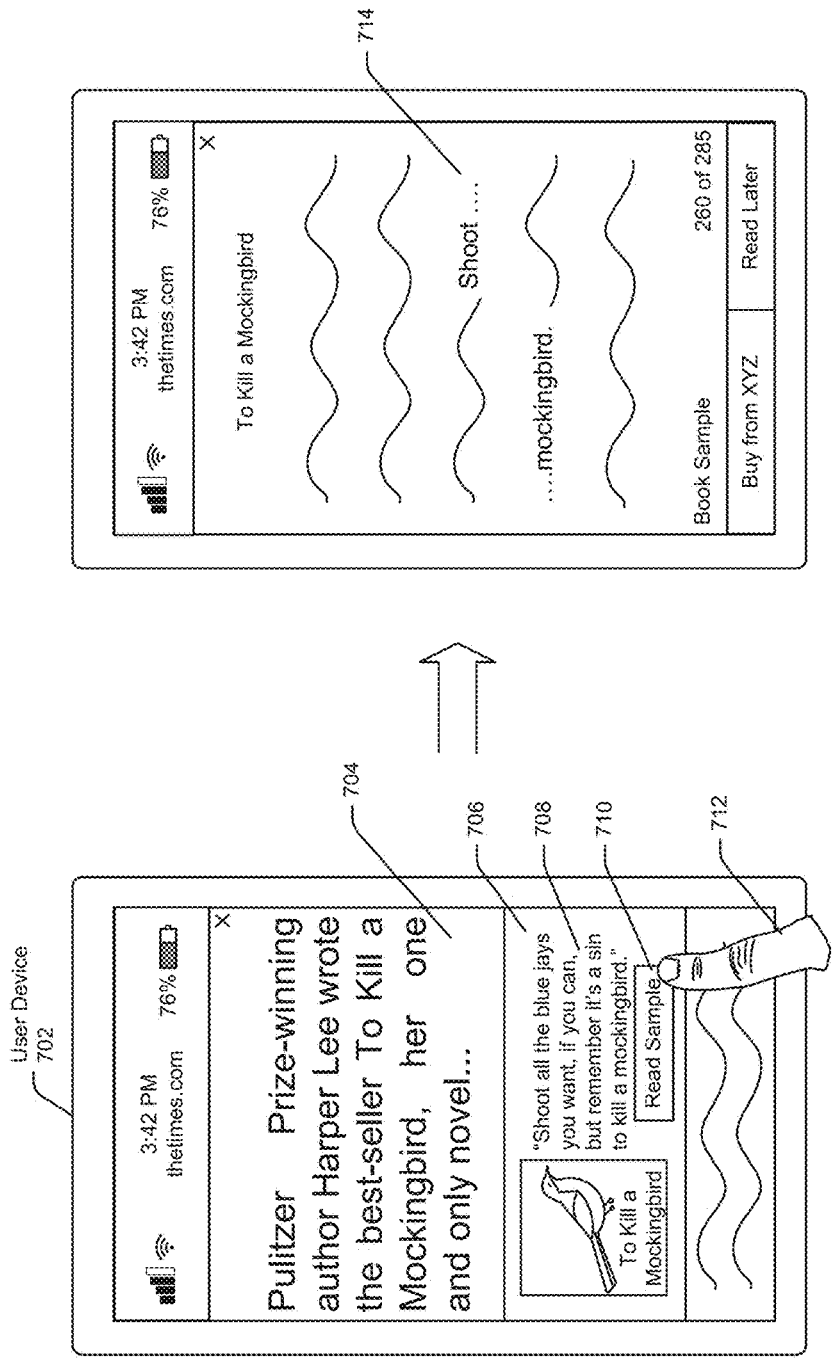
FIG. 7 is a schematic diagram of another illustrative use case in which electronic content related to source content rendered by a browser application is previewed using a reader application that is launched via user interaction with the browser application in accordance with one or more example embodiments of the disclosure.

FIG. 7 is a schematic diagram of another illustrative use case in which electronic content related to source content rendered by a browser application is previewed using a reader application that is launched via user interaction with the browser application in accordance with one or more example embodiments of the disclosure.

As shown in FIG. 7, a browser application executing on a user device 702 may be rendering website content 704. The website content 704 may include a specific reference (e.g., a book title, a numeric identifier, etc.) of an e-book. A content card 706 corresponding to the e-book referenced by the website content 704 may be presented in conjunction with the website content 704. The content card 706 may include an excerpt 708 such as a quote from the e-book. The quote 708 may have been identified using any of the techniques previously described. The content card 706 may include a widget 710 that responsive to user selection 712 causes a reader application for previewing the e-book content to be launched. The reader application may be launched in connection with the browser application. An initial portion 714 of the sample preview that is displayed in the UI of the reader application may include the quote 708 and a portion of the e-book content that immediately precedes the quote 708 and a portion that immediately follows the quote. The user may be provided with the capability to transition to other portions of the sample preview by, for example, providing audible input, touch input, or the like to the user device 702.

Figure 8:
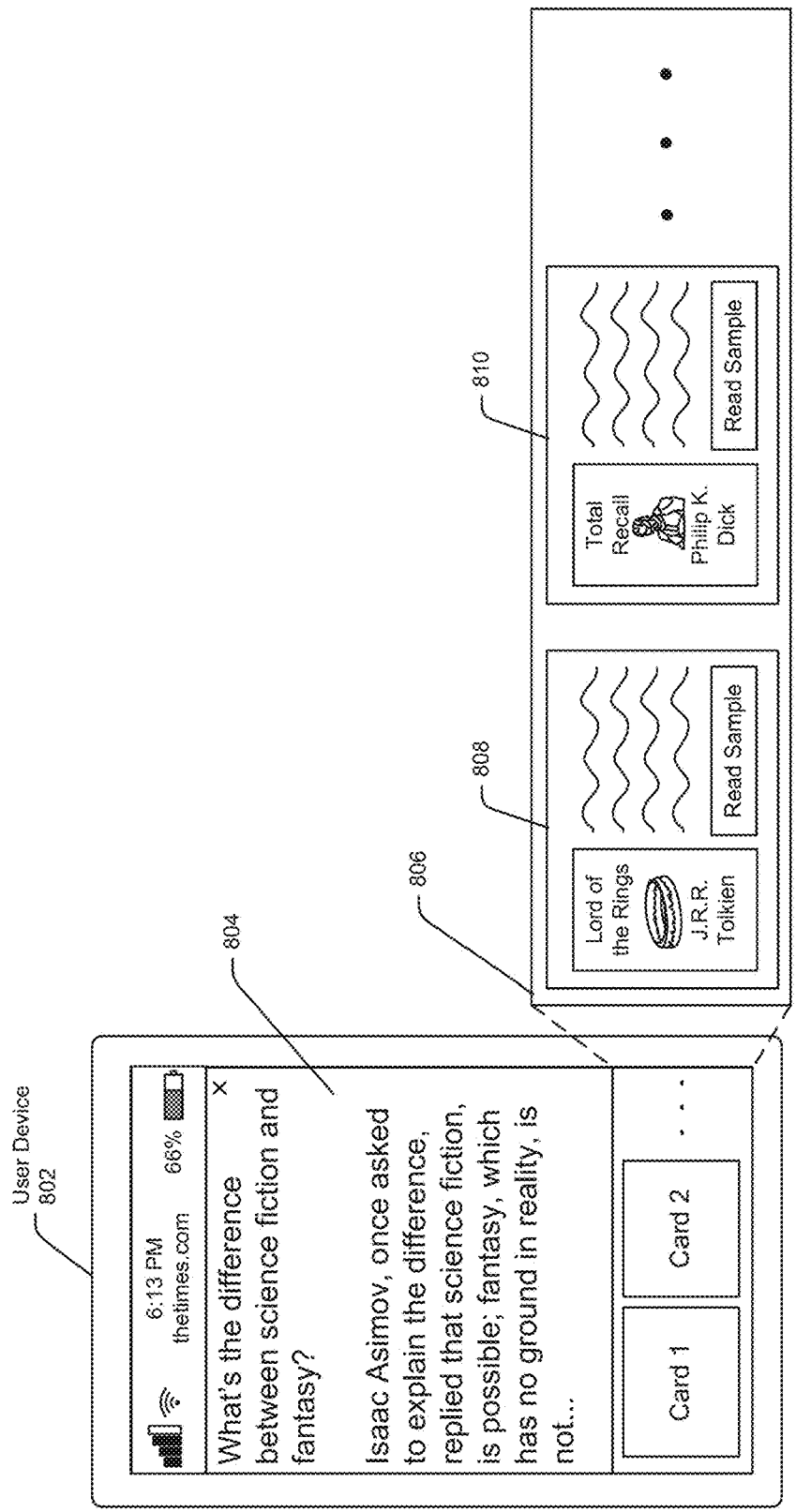
FIG. 8 is a schematic diagram of an illustrative use case in which candidate electronic content items determined to be relevant to source content rendered by a browser application are capable of being previewed using a reader application that can be launched via user interaction with the browser application in accordance with one or more example embodiments of the disclosure.

FIG. 8 is a schematic diagram of an illustrative use case in which candidate electronic content items determined to be relevant to source content rendered by a browser application are capable of being previewed using a reader application that can be launched via user interaction with the browser application in accordance with one or more example embodiments of the disclosure.

A user device 802 is illustratively depicted. A browser application executing on the user device 802 may render website content 804. As previously described, in certain example embodiments of the disclosure, the website content 804 may not include a specific reference (e.g., an identifier) to an e-book. In such example embodiments, the website content 804 may be analyzed to locate one or more predetermined character strings in the website content 804. The character strings identified from the website content 804 may be provided to the recommendations engine 276, which may be configured to identify candidate e-books to recommend based on a correspondence between the identified character strings and metadata associated with the candidate e-books. In this manner, the candidate e-books that are identified may relate to similar subject matter as the website content 804. One or more content cards 808, 810 for the candidate e-books may then be presented in, for example, a scrollable carousel 806 within a presentation of the website content 804.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    determining a subject matter of text on a website;
    determining a relationship between subject matter described in an electronic book and the determined subject matter of the text on the website;
    determining in the electronic book a first text portion and a second text portion based on the relationship;
    determining a first semantic context associated with the first text portion;
    determining a second semantic context associated with the second text portion;
    determining that the first semantic context and the second semantic context satisfy a threshold context tolerance associated with the text on the website;
    causing presentation of the first text portion a first number of times within a user-selectable interface displayed on the website concurrently with the text on the website;
    determining a first performance metric associated with the presentation of the first text portion the first number of times in the user-selectable interface, the first performance metric indicating a number of user interactions with the first text portion;
    causing presentation of the second text portion a second number of times within the user-selectable interface displayed on the website concurrently with the text on the website and with the first text portion;
    determining a second performance metric associated with the presentation of the second text portion the second number of times, the second performance metric indicating a second number of user interactions with the second text portion;
    determining that the first performance metric exceeds the second performance metric;
    selecting the first text portion for inclusion in a content card corresponding to the electronic book; and
    causing a browser application executing on a user device to display the content card on the website in association with the text on the website.

2. The method of claim 1, wherein the electronic book is a first electronic book and the website is a first website, the method further comprising:
    determining that subject matter described in a second electronic book is related to subject matter of text on a second website;
    determining, using aggregate user consumption data for the second electronic book, that a first text portion of the second electronic book is associated with more than a threshold number of user annotations, highlights, or bookmarks; and
    selecting the first text portion of the second electronic book for inclusion in a content card corresponding to the second electronic book.

3. The method of claim 1, wherein the electronic book is a first electronic book and the website is a first website, the method further comprising:
    determining that subject matter described in a second electronic book is related to subject matter of text on a second website;
    determining that a user-generated message corresponding to a user accessing the second website via the browser application comprises an indication of a first text portion of the second electronic book; and
    selecting the first text portion of the second electronic book for inclusion in a content card corresponding to the second electronic book.

4. A method, comprising:
    determining a subject matter of website source content;
    determining a relationship between first electronic content and the website source content based on the determined subject matter;
    determining in the first electronic content a first portion and a second portion based on the relationship;
    determining a first semantic context associated with the first portion;

determining a second semantic context associated with the second portion;
determining that the first semantic context and the second semantic context satisfy a threshold context tolerance associated with the website source content;
causing presentation of the first portion a first number of times within a user-selectable interface displayed on the website concurrently with the website source content;
determining a first performance metric associated with the presentation of the first portion the first number of times in the user-selectable interface, wherein the first performance metric comprises at least a number of shares of a sample preview of the first electronic content that are associated with a number of times the user-selectable interface is displayed;
causing presentation of the second portion a second number of times within the user-selectable interface displayed on the website concurrently with the website source content;
determining a second performance metric associated with the presentation of the second portion the second number of times;
determining that the first performance metric exceeds the second performance metric;
selecting the first portion for inclusion in a visual representation of the first electronic content; and
causing a browser application executing on a user device to display the visual representation in association with the website source content.

5. The method of claim 4, further comprising determining that the at least a number of shares of the sample preview exceeds a threshold.

6. The method of claim 4, wherein the determining the first portion and the second portion comprises:
determining portions of the first electronic content based on the relationship; and
selecting at least one of the first portion or the second portion at random from the portions.

7. The method of claim 4, further comprising:
selecting a third portion of the first electronic content having one or more common text elements with the first portion of the first electronic content when the first performance metric exceeds the second performance metric;
causing the third portion of the first electronic content to be presented a third number of times in association with the website source content;
determining a third performance metric associated with the presentation of the third portion of the first electronic content the third number of times;
determining that the third performance metric exceeds the first performance metric; and
replacing the first portion of the first electronic content with the third portion of the first electronic content in the visual representation.

8. The method of claim 4, further comprising:
determining a third performance metric associated with the presentation of the first portion of the first electronic content the first number of times;
determining a fourth performance metric associated with the presentation of the second portion of the first electronic content the second number of times;
determining that the fourth performance metric exceeds the third performance metric; and
replacing the first portion of the first electronic content with the second portion of the first electronic content in a content card.

9. The method of claim 4, further comprising:
determining that second electronic content is related to second website source content;
determining, using aggregate user consumption data for the second electronic content, that a first portion of the second electronic content is associated with more than a threshold number of user annotations, highlights, or bookmarks; and
selecting the first portion of the second electronic content for inclusion in a visual representation of the second electronic content.

10. The method of claim 4, further comprising:
determining that second electronic content is related to second website source content;
determining that a user-generated message corresponding to a user accessing the second website source content via the browser application comprises an indication of a first portion of the second electronic content; and
selecting the first portion of the second electronic content for inclusion in a visual representation of the second electronic content.

11. The method of claim 10, wherein the second electronic content is an electronic book and the first portion of the second electronic content is quoted text of the electronic book.

12. The method of claim 4, wherein the first performance metric comprises a number of indications of positive user sentiment towards the first portion of the first electronic content and the second performance metric comprises a number of indications of positive user sentiment towards the second portion of the first electronic content.

13. A system, comprising:
at least one memory storing computer-executable instructions; and
at least one processor communicatively coupled to the at least one memory and configured to access the at least one memory and execute the computer-executable instructions to:
determine a subject matter of website source content;
determine a relationship between electronic content and the website source content based on the determined subject matter;
determine in the electronic content a first portion and a second portion based on the relationship;
determine a first semantic context associated with the first portion;
determine a second semantic context associated with the second portion;
determine that the first semantic context and the second semantic context satisfy a threshold context tolerance associated with the website source content;
cause presentation of the first portion a first number of times within a user-selectable interface displayed on the website concurrently with the website source content;
determine a first performance metric associated with the presentation of the first portion the first number of times in the user-selectable interface, wherein the first performance metric comprises at least a number of shares of a sample preview of the electronic content that are associated with a number of times the user-selectable interface is displayed;

cause presentation of the second portion a second number of times within the user-selectable interface displayed on the website concurrently with the website source content;

determine a second performance metric associated with the presentation of the second portion the second number of times;

determine that the first performance metric exceeds the second performance metric;

select the first portion for inclusion in a visual representation of the electronic content; and cause a browser application executing on a user device to display the visual representation in association with the website source content.

14. The system of claim 13, wherein the at least one processor is further configured to execute the computer-executable instructions to determine that the at least the number of shares of the sample preview exceeds a threshold.

15. The system of claim 13, wherein the at least one processor is configured to determine the first portion and the second portion by executing the computer-executable instructions to:

determine portions of the electronic content based on the relationship; and select at least one of the first portion or the second portion at random from the portions.

16. The system of claim 13, wherein the at least one processor is further configured to execute the computer-executable instructions to:

select a third portion of the electronic content having one or more common text elements with the first portion of the electronic content when the first performance metric exceeds the second performance metric;

cause the third portion of the electronic content to be presented a third number of times in association with the website source content;

determine a third performance metric associated with the presentation of the third portion of the electronic content the third number of times;

determine that the third performance metric exceeds the first performance metric; and replace the first portion of the electronic content with the third portion of the electronic content in the visual representation.

17. The system of claim 13, wherein the at least one processor is further configured to execute the computer-executable instructions to:

determine a third performance metric associated with the presentation of the first portion of the electronic content the first number of times;

determine a fourth performance metric associated with the presentation of the second portion of the electronic content the second number of times;

determine that the fourth performance metric exceeds the third performance metric; and replace the first portion of the electronic content with the second portion of the electronic content in a content card.

18. The method of claim 1, wherein:

determining the relationship comprises matching the subject matter of the text on the website to a content tag of the electronic book; and determining the first text portion and the second text portion comprises determining that the first semantic context and the second semantic context correspond to the content tag.

19. The method of claim 4, wherein:

determining the relationship comprises matching the website source content to a content tag of the first electronic content; and determining the first portion and the second portion comprises determining that the first semantic context and the second semantic context correspond to the content tag.

20. The system of claim 13, wherein the at least one processor is configured to:

determine the relationship by matching the website source content to a content tag of the electronic content; and determine the first portion and the second portion by determining that the first semantic context and the second semantic context correspond to the content tag.

* * * * *